United States Patent [19]
Watanabe

[11] 3,718,756
[45] Feb. 27, 1973

[54] MAPPING RECTIFIER OF EARTH'S SURFACE RADIATION SIGNAL SCANNED BY ARTIFICIAL SATELLITE

[75] Inventor: Kantaro Watanabe, Tokyo, Japan

[73] Assignee: Research Corporation, New York, N.Y.

[22] Filed: May 14, 1971

[21] Appl. No.: 143,453

[52] U.S. Cl............................178/6.7 R, 178/6.8, 343/17, 355/52
[51] Int. Cl.........G01s 7/06, G03b 27/68, H04n 1/24
[58] Field of Search..........178/6.5, 6.7 R, 6.8; 343/5, 343/5 PC, 17; 355/52

[56] References Cited
UNITED STATES PATENTS

| | | |
|---|---|---|
| 3,026,765 | 3/1962 | Guarricini ............................ 355/52 |
| 3,319,105 | 5/1967 | Koda ..................................... 343/17 |
| 3,401,595 | 9/1968 | Dinhobel .............................. 355/52 |

Primary Examiner—Howard W. Britton
Attorney—Robert S. Dunham, P. E. Henninger, Lester W. Clark, Gerald W. Griffin, Thomas F. Moran, Howard J. Churchill, R. Bradlee Boal, Christopher C. Dunham, Robert Scobey, Henry T. Burke and Ivan S. Kavrukov

[57] ABSTRACT

Disclosed is a device to obtain, through a special cathode-ray tube an optical system, a radiation image polarstereographically mapped directly from radiation scanning signals received from an artificial satellite.

7 Claims, 2 Drawing Figures

PATENTED FEB 27 1973 3,718,756

INVENTOR
KANTARO WATANABE
BY
Ivan S. Kavrukov
ATTORNEY

MAPPING RECTIFIER OF EARTH'S SURFACE RADIATION SIGNAL SCANNED BY ARTIFICIAL SATELLITE

BACKGROUND OF THE INVENTION

Some artificial satellites, as for example the meteorological satellite Nimbus, scan with a radiometer the earth's surface (at ground, sea and cloud levels) nearly perpendicularly to the satellite orbital plane to measure the intensities of the radiation emitted by the earth's surface, the solar radiation reflected by the earth's surface, etc., and transmit the radiation scanning signals in sequence to a ground station by radio. The series of radiation scanning signals received by the ground station are reproduced in the form of a radiation image on a sheet of photographic film or facsimile photosensitive paper.

Because the earth's surface is spherical, the radiation image thus obtained is more distorted in a portion corresponding to a greater scanning angle with respect to the vertical axis, in other words, in an area closer to the horizon. It is therefore necessary to rectify such distortion in the radiation image and then to convert the rectified image into the form of a polarstereographic, Lambert or Mercator map when the radiation image transmitted from an artificial satellite is to be used for scientific purposes. It is also necessary to take into account the orbital motion of the satellite and the rotation of the earth with respect to the satellite orbital plane

SUMMARY OF THE INVENTION

The invention relates to providing mapping rectification of earth's surface radiation scanned by an artificial satellite along scan lines which are substantially perpendicular to the satellite orbital plane. The satellite transmits radiation scan signals which vary as a function of radiation parameters of each scan line. These radiation scan signals transmitted by the satellite are applied to a specially designed cathode ray tube which has a concave screen congruent with a spherical surface to generate on the screen a succession of images, each image corresponding to a scan line and having a visible parameter, such as light intensity, varying as the radiation parameter of the scan line to which it corresponds. A camera is placed in the vicinity of the spherical surface such that the camera lens front nodal point is on the spherical surface at a point which corresponds either to the North or South Pole of the earth. The front nodal point of the camera and the image which is shown in the cathode ray tube screen are positioned with respect to the spherical surface to reflect the position, with respect to the earth North Pole, of the satellite scan line which generates the image on the cathode ray tube.

The factors for which compensation must be made are the fact that the scan lines are along a spherical surface, the fact that the satellite orbits the earth, and the fact that the earth rotates with respect to the satellite orbital plane. The compensation for the spherical surface of the earth is made by means of the concave surface of the cathode ray tube screen. A compensation for the orbital motion of the satellite around the earth is made by means of moving the cathode ray tube screen and the camera with respect to each other along the spherical surface. A compensation for the earth's rotation is made by means of rotating the camera (and the film in it) around an axis passing through the front nodal point of the camera lens and through the center of the spherical surface. As a result, the image on the film inside the camera, which is perpendicular to the axis of rotation of the camera, is a polarstereographic map projection of the satellite scan lines.

DETAILED DESCRIPTION

Figure 1:
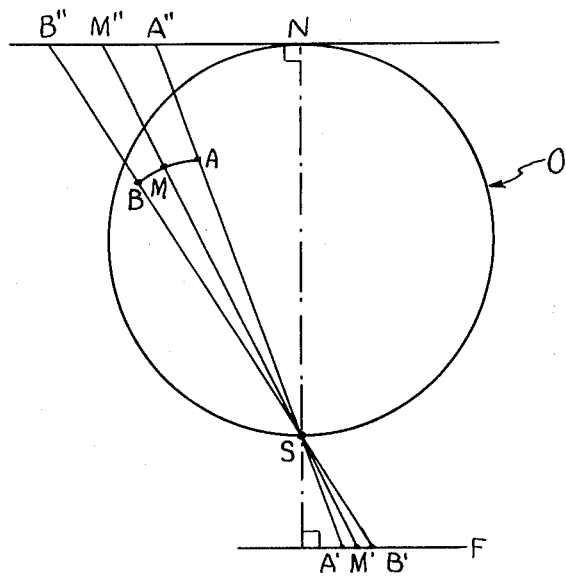
FIG. 1 is a diagram illustrating the principle of radiation scanning related to a device according to the present invention.

The circle in FIG. 1 represents the earth (or a sphere similar to the earth) as viewed from an infinitely distant point in the plane of the equator. N denotes the North pole and S denotes the South pole. Arc ABM represents a scanning line on the earth's surface in the part scanned by a radiometer on an artificial satellite when the artificial satellite is orbiting right above point M. If the radiation image on the scanning line is reproduced on a spherical surface similar to the earth's while a relationship similar to the actual scanning is maintained, and the reproduced image is photographed on a photosensitive plane (for example, photographic film) placed perpendicularly to the earth's axis NS, by a camera having the front nodal point of its lens set at the point corresponding to South Pole S when radiation scanning is effected on the northern hemisphere, or at the point corresponding to North Pole N when radiation scanning is effected on the southern hemisphere, the photographed image A'M'B' will be similar to the image A"M"B formed by projecting the earth's surface scanning line ABM from the South Pole S (or from the North Pole N) on the tangential plane at the North Pole N (or the South Pole S). Therefore, image A'M'B' on photosensitive plane F precisely coincides with a polarstereographic map.

The position of the radiation scanning line on the earth's surface scanned by a radiometer shifts from time to time as the artificial satellite orbits. A radiation image of the earth's surface, as rectified into a polarstereographic map, can be obtained from a series of radiation scanning signals transmitted from the artificial satellite by photographing the radiation scanning line images, reproduced on the aforementioned sphere, on one photosensitive plane with the camera at point S (or point N) while the image position is shifted from time to time so as to maintain a relationship similar to the actual radiation scanning of the earth's surface.

Although it is assumed in the foregoing description that the artificial satellite orbits around the earth which is not rotating but stationary, subpoint M, right below the artificial satellite, of the scanning line on the earth's surface gradually shifts westward, from the point involved in the above description, on the map because the earth rotates. To obtain an accurate map image by compensating for the earth rotation, it is necessary that the camera at point S (or point N) be rotated around the earth's axis NS at a certain constant angular velocity determined by the nodal period of the artificial satellite and the angular velocity of the earth rotation.

Figure 2:
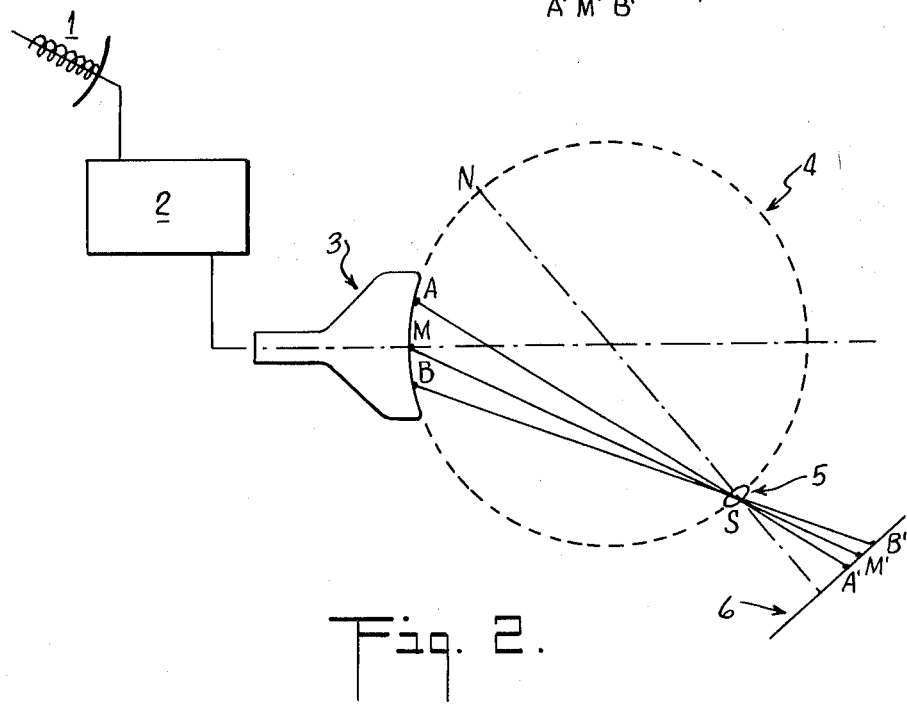
FIG. 2 is a diagram briefly illustrating an embodiment of the invention.

FIG. 2 briefly illustrates a mapping rectifier to realize the above-mentioned principle. Antenna 1 receives the radiation scanning signals transmitted from an artificial satellite. Receiver circuit 2 reproduces on cathode-ray tube 3 the images of the signals received. The surface of the cathode-ray tube screen is concave so as to form a segment of a spherical surface represented by broken line 4. The scanning line image produced on the cathode-ray tube screen is made to be similar to the radiation scanning line on the earth's surface scanned by a radiometer, by means of the electron-beam deflecting circuit of the cathode-ray tube. Center point M on the image corresponds to the subpoint right below the artificial satellite at the time the radiometer on the artificial satellite scans the subpoint. With photographic lens 5 whose front nodal point is set at point S (or point N) which is symmetric, with respect to the center of the sphere, to the point N (or point S) on the spherical surface corresponding to the position of the North Pole (or South Pole) of the earth at the time of the above-mentioned scanning, an image coinciding with a polarstereographic map can be obtained, as mentioned previously, by photographing the image shown on the cathode-ray tube screen on a photosensitive plane 6 which is placed perpendicularly to the axis NS.

When the succeeding scanning signal image is shown on the cathode-ray tube, the cathode-ray tube screen is slid along spherical surface 4 in a relation, with respect to spherical surface 4, to the actual orbiting condition of the artificial satellite, and simultaneously the photographic lens 5 and the photosensitive plane 6 are rotated around axis NS at an angular velocity determined by the nodal period of the artificial satellite and the angular velocity of the earth rotation, to photograph the image on the same photosensitive plane 6. By successively photographing images in the same manner, a radiation image of the earth's surface, as polarstereographically mapped, can be obtained from a series of radiation scanning signals transmitted from the artificial satellite.

In place of sliding the cathode-ray tube screen along spherical surface 4, the camera lens 5 and the photosensitive plane 6 may be slid along the spherical surface 4 while the cathode-ray tube 3 is fixed.

I claim:

1. Providing mapping rectification of earth's surface radiation scanned by an artificial satellite along scan lines which are substantially perpendicular to the satellite orbital plane, said satellite transmitting radiation scan signals varying as a function of a radiation parameter along each scan line, comprising the steps of: applying the radiation scan signals transmitted by the satellite to a cathode ray tube having a concave screen congruent with a spherical surface to generate on the screen a succession of images, each image corresponding to a scan line and having a visible parameter which varies as the radiation parameter of the scan line to which it corresponds; placing the front nodal point of a photographic camera at a point on said spherical surface which corresponds to one of the North and South poles of the earth and which is at the same relationship with the image on the cathode ray tube screen with respect to the spherical surface as the relationship between the scan line and the earth pole corresponding to the pole at which the camera lens front nodal point is placed; photographing the image on a photosensitive surface contained by the camera, said photosensitive surface placed perpendicularly to a line connecting the camera lens front nodal point and the center of said spherical surface.

2. Providing mapping rectification as in claim 1 including providing a compensation for the earth's rotation with respect to the satellite orbital plane by means of rotating the photosensitive surface inside the camera around an axis connecting the front nodal point of the camera lens and the center of the spherical surface at a velocity corresponding to the earth's rotation with respect to the satellite orbital plane.

3. Providing mapping rectification as in claim 1 including providing compensation for the satellite orbital motion by establishing and maintaining relative motion between the cathode ray tube and the camera, with the front nodal point of the camera remaining on the spherical surface and the cathode ray tube screen remaining congruent with the spherical surface, said relative motion corresponding to the relative displacement of satellite scan lines with respect to the earth poles.

4. Providing mapping rectification as in claim 3 including providing compensation for the earth's rotation with respect to the satellite orbital plane by means of rotating the photosensitive surface in the camera around an axis connecting the front nodal point of the camera lens and the center of the spherical surface at a constant velocity corresponding to the rotation of the earth with respect to the satellite orbital plane.

5. Providing mapping rectification of earth's surface radiation scanned by artificial satellite along scanning lines comprising the steps of receiving from an artificial satellite radiation scanning signals of the earth's surface, applying said signals to a cathode-ray tube having a spherically concave screen surface to generate an image on said concave screen surface, the attitude and shape of said image being made proportional in attitude and shape to the actual attitude and shape of the radiation scanning lines on the earth's surface by appropriately deflecting the electron beam of said cathode-ray tube.

6. Providing mapping rectification of earth's surface radiation scanned by artificial satellite according to claim 5 including placing the front nodal point of a camera lens at a point corresponding to one of the South and North Poles of the earth on a spherical surface which coincides with the screen surface of the above-mentioned cathode-ray tube, and causing an image produced on said cathode-ray tube screen to coincide with a polarstereographic map by projecting said image on a photosensitive plane that is placed perpendicularly to a straight line connecting the center of said spherical surface and the front nodal point of said lens.

7. Providing mapping rectification of earth's surface radiation scanned by artificial satellite according to claim 6, wherein an accurate radiation image of the earth's surface is obtained as polarstereographically mapped by compensating for the effect of the earth rotation by means of photographing the image shown on the cathode-ray tube screen while rotating the camera, with the front nodal point of the camera lens being placed at a point corresponding to one of the South and North Poles of the earth on the spherical surface that coincides with the screen surface of said cathode-ray tube around an axis passing through said one of the South and North poles and through the center of said spherical surface.

* * * * *